US012800124B2

(12) United States Patent
Shibakawa et al.

(10) Patent No.: US 12,800,124 B2
(45) Date of Patent: Nov. 17, 2026

(54) LIGHT TRANSMISSIVE PANEL FOR VEHICLE

(71) Applicant: TOYODA GOSEI CO., LTD., Kiyosu (JP)

(72) Inventors: Hiroko Shibakawa, Kiyosu (JP); Koji Okumura, Kiyosu (JP); Takayasu Ido, Kiyosu (JP); Kazuki Takao, Kiyosu (JP); Yasuhisa Kumamoto, Kiyosu (JP); Yuhki Kuramitsu, Kiyosu (JP); Keisuke Higuchi, Kiyosu (JP); Masaki Okada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/310,184

(22) Filed: Aug. 26, 2025

(65) Prior Publication Data

US 2026/0092689 A1 Apr. 2, 2026

(30) Foreign Application Priority Data

Sep. 27, 2024 (JP) ................................ 2024-169137

(51) Int. Cl.

| | |
|---|---|
| ***F21S 43/20*** | (2018.01) |
| ***B60R 13/00*** | (2006.01) |
| ***F21S 43/31*** | (2018.01) |
| ***F21S 43/50*** | (2018.01) |
| *F21W 104/00* | (2018.01) |
| *F21Y 115/10* | (2016.01) |

(52) U.S. Cl.

CPC ...... *F21S 43/28131* (2024.05); *B60R 13/005* (2013.01); *F21S 43/31* (2018.01); *F21S 43/50* (2018.01); *F21W 2104/00* (2018.01); *F21Y 2115/10* (2016.08)

(58) Field of Classification Search

CPC ...... F21S 43/28131; F21S 43/31; F21S 43/50; B60R 13/005; F21W 2104/00

See application file for complete search history.

(56) References Cited

U.S. PATENT DOCUMENTS 5,854,872 A * 12/1998 Tai ........................ G02B 6/4298 362/302

9,927,099 B2 * 3/2018 Wu ......................... F21V 13/08

(Continued)

FOREIGN PATENT DOCUMENTS

JP 2010-282010 A 12/2010

*Primary Examiner* — Christopher E Dunay

(74) *Attorney, Agent, or Firm* — Posz Law Group, PLC

(57) ABSTRACT

A light transmissive panel for a vehicle includes base and a decorative layer. The base is disposed at a side of the light transmissive panel at which a design surface is provided. The base is transmissive to visible light. The decorative layer is stacked on a surface of the base body on a side opposite to the design surface. The light transmissive panel includes multiple apertures formed through the decorative layer in a thickness direction. Each aperture has a bottom surface formed by the base. The bottom surface has irregularities. The apertures are filled with filling portions, which are transmissive to visible light. The base and the filling portions are each formed of a plastic material with which the difference in refractive index between the base and the filling portions is less than the difference in refractive index between the base and air.

4 Claims, 2 Drawing Sheets

(56) References Cited

U.S. PATENT DOCUMENTS

| | | | | |
|---|---|---|---|---|
| 2019/0001880 | A1* | 1/2019 | Schneider | G02B 6/006 |
| 2020/0017047 | A1* | 1/2020 | Kondo | C09D 7/69 |
| 2020/0262744 | A1* | 8/2020 | Fenton | C03C 15/00 |
| 2024/0159957 | A1* | 5/2024 | Bucar | G02B 6/0091 |
| 2024/0319328 | A1* | 9/2024 | Aoyama | H01Q 1/42 |
| 2025/0313067 | A1* | 10/2025 | Yu | C03C 27/10 |
| 2025/0388180 | A1* | 12/2025 | Nakaishi | B60R 13/005 |

* cited by examiner

LIGHT TRANSMISSIVE PANEL FOR VEHICLE

CROSS-REFERENCE TO RELATED APPLICATIONS

This application is based upon and claims the benefit of priority from Japanese Patent Application No. 2024-169137, filed on Sep. 27, 2024, the entire contents of which are incorporated herein by reference.

BACKGROUND

1. Field

The present disclosure relates to a light transmissive panel for a vehicle.

2. Description of Related Art

JP2010-282010A describes a backlit display panel that transmits light from a light source disposed on the back surface of the panel to the front surface to enable backlighting. This backlit display panel includes an opaque layer, a transparent layer stacked on one surface of the opaque layer, and multiple apertures formed through the opaque layer. The opaque layer is a plastic layer that has been made opaque by adding a colorant such as a pigment or a dye. The transparent layer is a plastic layer that is formed, for example, by incorporating a colorant into a transparent plastic composition in an amount to achieve both a sufficient coloring effect and a sufficient amount of transmitted light. The multiple apertures are formed, for example, using a laser ablation process with ultraviolet light.

In this backlit display panel, light emitted from the light source passes through the apertures and is transmitted through the transparent layer, thereby enabling backlighting with a color corresponding to that of the transparent layer.

However, in such backlit display panels, if the opaque layer is not sufficiently removed by the laser beam during formation of the apertures, the transmission of light from the light source may be obstructed by the remaining opaque layer. To address this issue, in the related art, multiple apertures are formed so that some of the apertures reach the inside of the transparent layer. However, in this case, the portion of the transparent layer that serves as the light incident surface may become roughened by the laser beam, thereby forming minute surface irregularities at the light incident surface. As a result, light incident on the transparent layer may undergo diffuse reflection at the incident surface, potentially leading to a decrease in the light transmittance of the transparent layer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a light transmissive panel for a vehicle is configured to be disposed outward of a light source and to form a part of an outer shell of the vehicle. The light transmissive panel includes a base and a decorative layer. The base is disposed at a side of the light transmissive panel at which a design surface is provided. The base is transmissive to visible light. The decorative layer is stacked on a surface of the base on a side opposite to the design surface. The light transmissive panel includes multiple apertures formed through the decorative layer in a thickness direction. Each aperture has a bottom surface formed by the base. The bottom surfaces each have irregularities. The apertures are filled with filling portions that are transmissive to visible light. The base and the filling portions are each formed of a plastic material with which a difference in refractive index between the base and the filling portions is less than a difference in refractive index between the base and air.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Light transmissive panels for vehicles according to embodiments will now be described with reference to FIGS. 1 to 3. In each embodiment, the present disclosure is embodied as a luminous emblem for a vehicle. Hereinafter, the front-rear direction of the vehicle will be referred to as a front-rear direction. The front side and the rear side in the front-rear direction are simply referred to as forward and rearward.

First Embodiment

Figure 1:
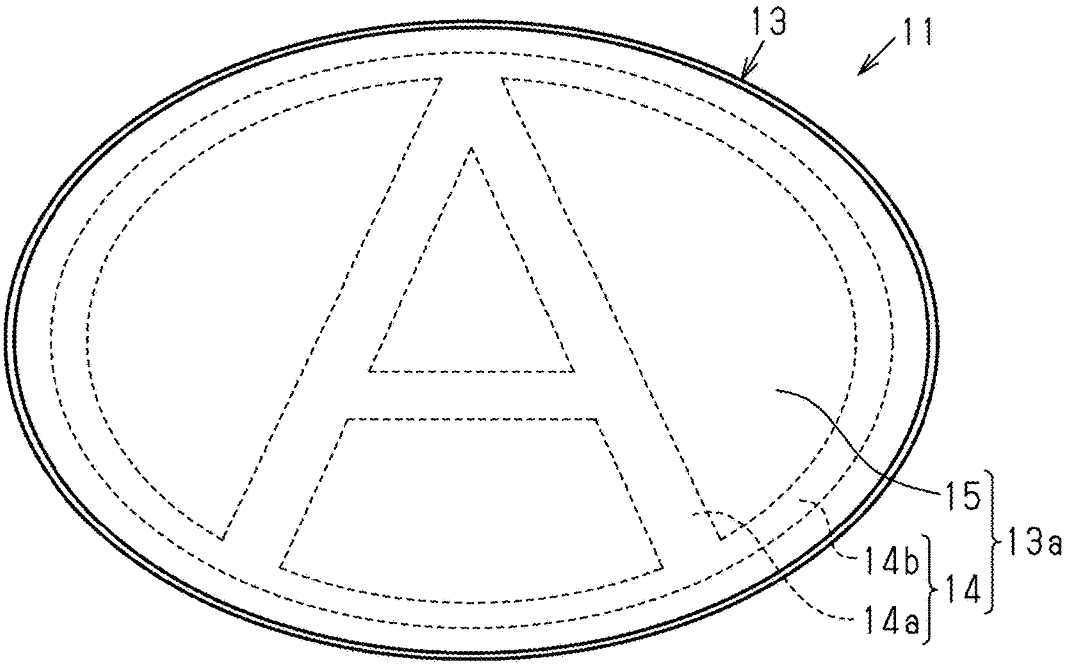
FIG. 1 is a front view showing a luminous emblem that includes a light transmissive panel for a vehicle according to a first embodiment.
Figure 2:
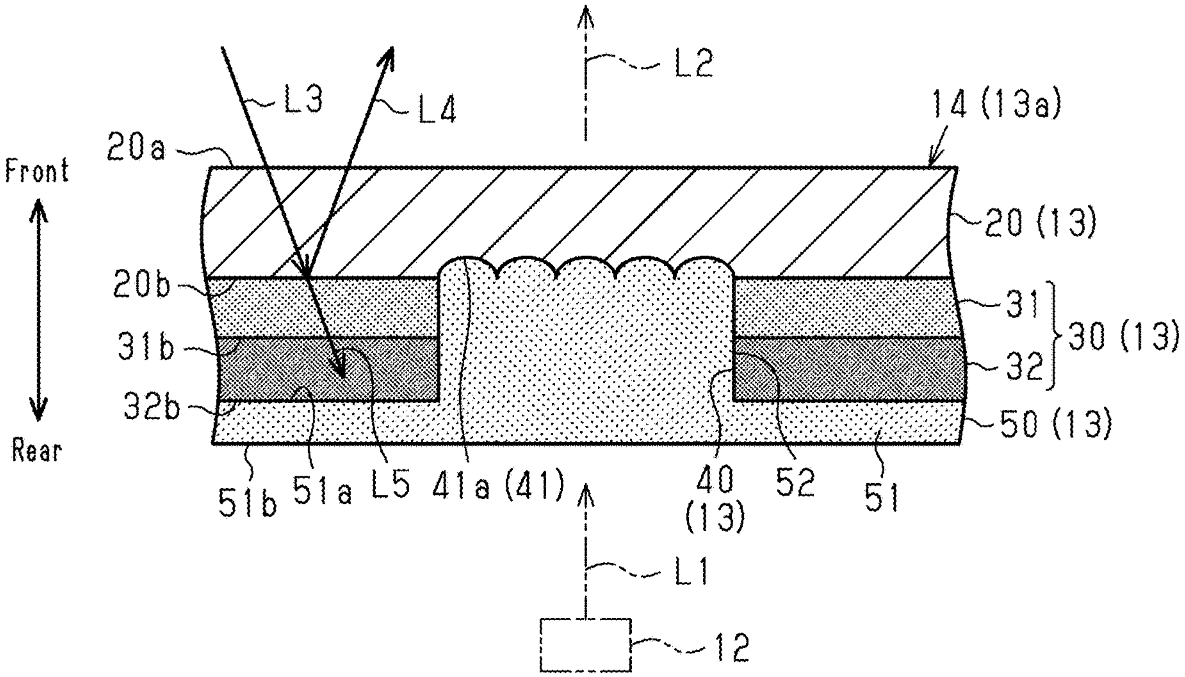
FIG. 2 is an enlarged cross-sectional view of one of multiple apertures in the luminous emblem shown in FIG. 1.

As shown in FIGS. 1 and 2, a light source 12 and a luminous emblem 13 disposed forward of the light source 12 are attached to a front portion 11 of the vehicle. The light source 12 includes, for example, a light-emitting element such as a light-emitting diode (LED). The light source 12 is attached to the vehicle so as to emit visible light in the front-rear direction. In other words, in the present embodiment, the front-rear direction of the vehicle corresponds to the emission direction of the visible light from the light source 12. Hereinafter, the visible light emitted from the light source 12 may be simply referred to as light L1, to be distinguished from visible light incident from the outside.

As shown in FIGS. 1 and 2, the luminous emblem 13 forms a part of an exterior panel as an outer shell of the vehicle, and has the shape of a plate having a thickness in the front-rear direction in a state of being attached to the vehicle. The contour of the luminous emblem 13 is circular as viewed from the front. The luminous emblem 13 includes a design surface 13*a*. The design surface 13*a* includes an indication region 14, which represents a mark facing outward, and a background region 15, which is a portion other than the indication region 14. The term "mark" in this description refers to elements such as stylized text (logotype) that represents the vehicle manufacturer's name, the model name, or the grade name; a symbolic figure representing the vehicle manufacturer (symbol mark); or a logo mark that combines the text and the figure. In the present embodiment, the indication region 14 includes a character portion 14*a* indicating the letter "A" and an annular portion 14*b* extending along the outer peripheral edge of the luminous emblem 13 to surround the character portion 14*a*.

As shown in FIG. 2, the luminous emblem 13 includes a base 20, a decorative layer 30, and a filling layer 50.

Base 20

The base 20 is made of a transparent plastic material transmissive to visible light. As the plastic material forming the base 20, for example, an acrylic resin such as a polymethyl methacrylate resin (PMMA), polycarbonate (PC), or the like can be used. In the present embodiment, the base 20 is formed of PC (refractive index: 1.59) and is colorless and transparent. The base 20 is disposed at the side at which the design surface 13*a* is provided (front side in the present embodiment). Specifically, the base 20 is disposed at the frontmost position in the luminous emblem 13.

Decorative Layer 30

As shown in FIG. 2, the decorative layer 30, which decorates the luminous emblem 13, is stacked on and joined to a rear surface 20*b* of the base 20. The rear surface 20*b* is a surface on a side (rear side in the present embodiment) opposite to the design surface 13*a*. The decorative layer 30 includes a colored layer 31 and a concealing layer 32.

The colored layer 31 is a plastic layer containing a colorant such as a pigment or a dye. In the present embodiment, the colored layer 31 is a colored coating film formed by applying a paint, in which a pigment of any desired color is dispersed, onto the rear surface 20*b* of the base 20.

The concealing layer 32 is a plastic layer containing a colorant having a higher hiding power than the colorant contained in the colored layer 31. Specifically, the concealing layer 32 is formed of a plastic material in which a white pigment that reflects visible light, such as titanium oxide, or a black pigment that absorbs visible light, such as carbon black, is dispersed. In the present embodiment, the concealing layer 32 is a black coating film formed by applying a paint, in which carbon black is dispersed, onto the rear surface 31*b* of the colored layer 31.

The luminous emblem 13 includes multiple apertures 40 that extend through the decorative layer 30 in the front-rear direction, which is the thickness direction of the decorative layer 30. The indication region 14 is formed by the apertures 40. The diameters of the apertures 40 are, for example, in a range of 0.06 mm to 2.0 mm. Each of the apertures 40 extends through the decorative layer 30, and a part thereof (hereinafter, a bottom portion 41) extends to the base 20. That is, the bottom portion 41 of each aperture 40 is formed by the base 20. The bottom portion 41 has a bottom surface 41*a*, which forms part of the rear surface 20*b* of the base 20. The bottom surface 41*a* is provided with fine irregularities formed by a laser beam. As used herein, "laser beam" refers to laser radiation having a wavelength emitted by known laser devices used for plastic layer ablation, such as a YAG laser and a carbon dioxide laser, and includes, for example, light having a wavelength of approximately 1064 nm (NIR laser), 532 nm (green laser), 355 nm (UV laser), or in a range of 9.2 μm to 10.8 μm (FIR laser).

Filling Layer 50

The filling layer 50 is provided at the side of the decorative layer 30 that is opposite to the base 20 in the front-rear direction. The filling layer 50 includes a base layer 51 and multiple filling portions 52. The base layer 51 is stacked on and joined to the rear surface 32*b* of the concealing layer 32. A rear surface 51*b* of the base layer 51 primarily defines the rear surface of the luminous emblem 13. The rear surface 51*b* faces the light source 12 in the front-rear direction. The rear surface 51*b* is smoother than the bottom surfaces 41*a*. The filling portions 52 are portions of the filling layer 50 that fill the apertures 40. Each filling portion 52 protrudes forward from the front surface 51*a* of the base layer 51.

The filling layer 50 is made of a transparent plastic material transmissive to visible light. The filling layer 50 is formed of a plastic material with which the difference in refractive index between the base 20 and the filling layer 50 is less than the difference in refractive index between the base 20 and air (refractive index: 1.00). To increase the transmittance of light L1 through the base 20, it is preferable to use a plastic material with which the refractive index difference between the base 20 and the filling layer 50 is 0.2 or less. Examples of such plastic materials include transparent plastics such as acrylic resins. In the present embodiment, the filling layer 50 is formed of PMMA (refractive index: 1.49) and is colorless and transparent.

Operation of the First Embodiment

Light L1 emitted from the light source 12 enters the filling layer 50, passes through the filling portions 52, and is incident on the interface with the base 20, namely, the bottom surface 41*a* of each aperture 40. The light L1 then enters the base 20, passes through the base 20, and is emitted outward (see light L2 indicated by the long-dash double-short-dash line inn FIG. 2), thereby illuminating the indication region 14 of the luminous emblem 13, which corresponds to the apertures 40.

In addition, according to the configuration of the first embodiment, the difference in refractive index between the base 20 (refractive index: 1.59) and the filling layer 50 (refractive index: 1.49) is less than the difference in refractive index between the base 20 and air (refractive index: 1.00). In general, the reflectance and refraction of light at the interface between materials having different refractive indices decrease as the difference between the refractive indices decreases. Therefore, compared to a configuration without the filling layer 50, the diffuse reflection component of light L1 at the interface with the base 20 is reduced.

In addition, according to the configuration of the first embodiment, the incident surface of light L1 in the luminous emblem 13 is defined by the interface between the filling layer 50 and air, i.e., the rear surface 51*b*. The rear surface 51*b* is smoother than the bottom surface 41*a* of the aperture 40. Accordingly, compared to a case in which the incident surface is defined by the bottom surface 41*a* of the aperture 40, diffuse reflection of light L1 at the incident surface is reduced. In particular, in the configuration of the first embodiment, the refractive index of the filling layer 50 (1.49), which defines the incident surface of light L1, is greater than the refractive index of air (1.00) and less than the refractive index of the base 20 (1.59). Therefore, compared to a case in which the filling layer 50 is formed of a plastic material having a refractive index greater than or equal to the refractive index of the plastic material forming the base 20, the reflection and refraction of light L1 incident on the filling layer 50 are reduced.

Advantages of the First Embodiment (1-1) The luminous emblem 13 includes the base 20, which is transmissive to visible light, and the decorative layer 30, which is stacked on and joined to the rear surface 20*b* of the base 20. The luminous emblem 13 includes the multiple apertures 40, which extend through the decorative layer 30 in the front-rear direction and each have the bottom surface 41*a* formed of the base 20. The bottom surface 41*a* has irregularities. The apertures 40 are filled with the filling portions 52, which are transmissive to visible light. The base 20 and the filling layer 50 are each formed of a plastic material with which the difference in refractive index between the base 20 and the filling layer 50 is less than the difference in refractive index between the base 20 and air.

This configuration operates in the above-described manner. Accordingly, the transmittance of light L1 through the luminous emblem 13 is increased.

(1-2) The base 20 and the filling layer 50 are each formed of a plastic material with which the difference in refractive index between the base 20 and the filling layer 50 is 0.2 or less.

With this configuration, the effect of reducing the diffuse reflection component of light L1 at the interface between the filling layer 50 and the base 20 is favorably achieved. Accordingly, the transmittance of light L1 through the luminous emblem 13 is further increased.

(1-3) The decorative layer 30 includes the colored layer 31, which contains a pigment, and the concealing layer 32, which is provided at the side of the colored layer 31 opposite to the base 20 in the front-rear direction and contains a black pigment having a higher concealing power than the pigment contained in the colored layer 31.

With this configuration, as illustrated in FIG. 2, visible light incident on the front surface 20*a* from the outside (hereinafter, referred to as light L3) is reflected by the colored layer 31 (refer to light L4). Thus, the design surface 13*a* of the luminous emblem 13 is visible from the outside in a color corresponding to the color of the colored layer 31 when the light source 12 is off.

With the above-described configuration, a portion of light L3 that is incident on the front surface 20a from the outside is transmitted through the colored layer 31 (i.e., light L5), and is absorbed by the concealing layer 32. As a result, components such as the light source 12, which are disposed inward of the concealing layer 32 (i.e., rearward in the present embodiment), is less likely to be visible from the outside. This configuration improves the appearance of the luminous emblem 13 in a state in which the light source 12. In FIG. 2, lights L3, L4, and L5 are depicted without accounting for refractive indices of the base 20, the colored layer 31, and the concealing layer 32, for illustrative purposes.

Second Embodiment

Next, a light transmissive panel for a vehicle according to a second embodiment will be described with reference to FIG. 3. A luminous emblem 113 of the second embodiment is different from the luminous emblem 13 of the first embodiment in that a base 120 is provided in place of the base 20.

The description hereafter will focus on differences from the first embodiment. In the second embodiment, each component may be denoted by a reference numeral "1," obtained by adding "100" to the reference numeral "" of the same or corresponding component of the first embodiment. Thus, the overlapping description will be omitted.

Base 120

Figure 3:
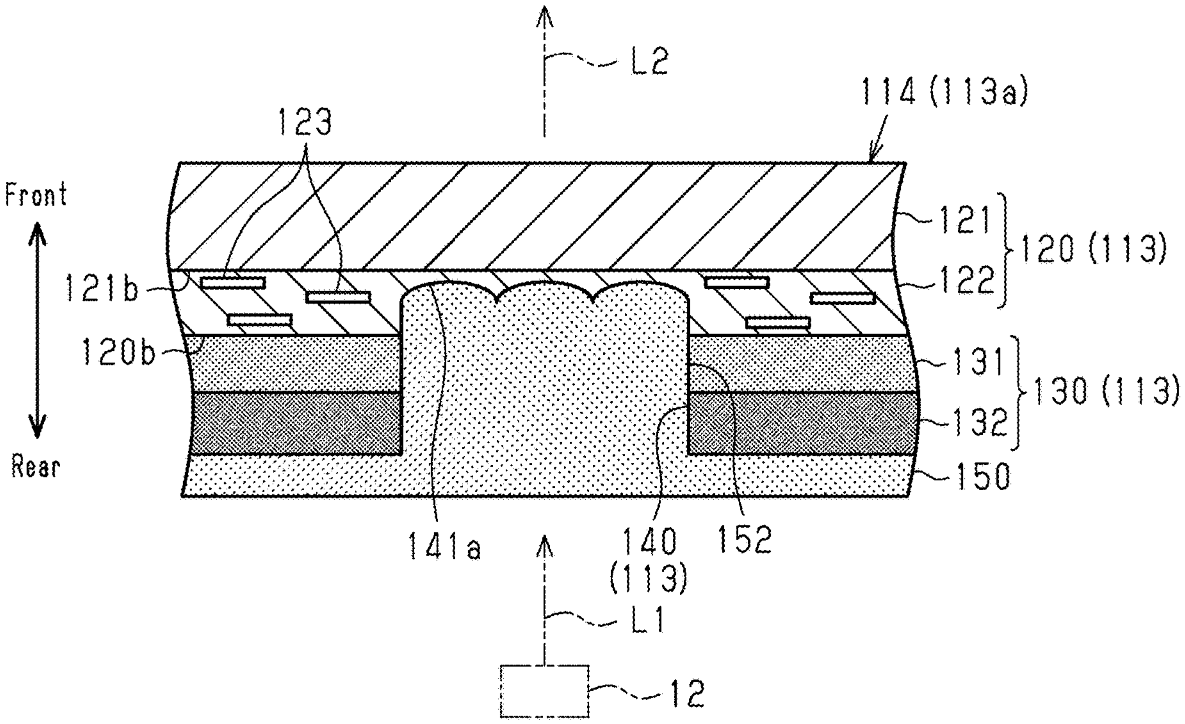
FIG. 3 is a cross-sectional view corresponding to FIG. 2, showing a light transmissive panel for a vehicle according to a second embodiment.

As shown in FIG. 3, the base 120 includes a base body 121 and a protective layer 122. The base body 121 is made of a transparent plastic material transmissive to visible light. As the plastic material forming the base body 121, for example, an acrylic resin such as a polymethyl methacrylate resin (PMMA), polycarbonate (PC), or the like can be used. In the present embodiment, the base body 121 is formed of PC (refractive index: 1.59) and is colorless and transparent. The base body 121 is disposed at the side at which the design surface 113*a* is provided. Specifically, the base body 121 is disposed at the frontmost position in the luminous emblem 113.

The protective layer 122 is stacked on and joined to the rear surface 121*b* of the base body 121, which is a surface opposite to the design surface 113*a*. The protective layer 122 is a plastic layer containing an additive 123 that reflects laser beams. In the present embodiment, the protective layer 122 is a coating film formed by applying a paint, in which the additive 123 is dispersed, onto the rear surface 121*b* of the base body 121. Examples of the additive 123 include sparkle particles such as glass flakes (average particle size: 40 μm) and a metal conductive filler such as aluminum flakes (average particle size: 52 μm). The mass concentration of the additive 123 in the protective layer 122 and the thickness of the protective layer 122 are preferably set so as not to impair the transmission of light L1 through the protective layer 122. For example, when glass flakes are used, the mass concentration of the additive 123 in the protective layer 122 is preferably in a range of 10% to 30%. When aluminum flakes are used, the mass concentration of the additive 123 in the protective layer 122 is preferably in a range of 5% to 15%. In any case, the film thickness of the protective layer 122 is preferably in a range of 15 μm to and 45 μm. In the present embodiment, the additive 123 includes aluminum flakes.

Operation and Advantages of the Second Embodiment

In addition to the advantages (1-1) to (1-3) of the first embodiment, the present embodiment has an advantage (2-1), described below.

(2-1) The base 120 includes the base body 121 and the protective layer 122. The protective layer 122 is stacked on the rear surface 121*b* of the base body 121, which is on the side opposite to the design surface 113*a*. The protective layer 122 contains the additive 123 that reflects laser beams.

Multiple apertures 140 are formed by laser machining. Specifically, a laminate formed by stacking a colored layer 131 and a concealing layer 132 in that order is placed on a rear surface 120*b* of the base 120, which is on the side opposite to the design surface 113*a*. The laminate is irradiated with laser beam onto the concealing layer 132. As a result, the portions of the decorative layer 130 corresponding to the apertures 140 are removed. With the above-described configuration, the protective layer 122 is stacked on the rear surface 121*b* of the base body 121, which is a surface opposite to the design surface 113*a*. Therefore, the laser beam is reflected by the additive 123 in the protective layer 122, so that the laser beam is less likely to be absorbed by the protective layer 122. Accordingly, the protective layer 122 is less likely to be removed by the laser beam, and the portions of the protective layer 122 that form bottom surfaces 141*a* of the apertures 140 are less likely to be roughened by the laser beam. In other words, the bottom surface 141*a* of each aperture 140 is less likely to have irregularities. Thus, the diffuse reflection component at the interface between the filling layer 150 (the filling portions 152) and the base 120 is further reduced. Accordingly, the transmittance of light L1 from the light source 12 through the luminous emblem 113 is further increased.

Modifications

The above-described embodiments may be modified as follows. The above-described embodiments and the following modifications can be combined as long as the combined modifications remain technically consistent with each other.

The concealing layer 32 may be omitted from the decorative layer 30. In other words, the decorative layer 30 may include only the colored layer 31.

The filling layer 50 is not limited to the colorless and transparent layer as illustrated in the first embodiment. For example, the filling layer 50 may be a colored transparent layer formed of an acrylic plastic mixed with a desired colorant.

In this configuration, the filling layer 50 is colored by the above-described pigment. As a result, as shown in FIG. 2, light L2 transmitted through the luminous emblem 13 and emitted to the outside changes to a color corresponding to the color of the filling layer 50, specifically, a color obtained by mixing the color of the filling layer 50 and the color of the light L1. As such, the color of light L2 can be changed only by appropriately changing the type of pigment in the filling layer 50. Additionally, the hue of light L2 can be adjusted by appropriately modifying the amount of the pigment in the filling layer 50. Moreover, when a pigment having a complementary color to the color of light L1 emitted from the light source 12 (e.g., yellow for blue) is used as the colorant, the color of light L2 can be adjusted to an achromatic color (e.g., white) resulting from the mixture of the color of the filling layer 50 and the color of light L1.

The base 20 and the filling layer 50 are not limited to the plastic materials used in the first embodiment. For example, the base 20 and the filling layer 50 may each be formed of a plastic material with which the difference in refractive index between the base 20 and the filling layer 50 is greater than 0.2.

The luminous emblem 13 is not limited to having the filling layer 50, and may have only the filling portions 52 by omitting the base layer 51 from the filling layer 50.

The luminous emblem 13 is not limited to the one in which the base 20 is disposed at the frontmost position in the luminous emblem 13 as illustrated in the first embodiment. For example, a hard coating layer may be further stacked on the front surface 20*a* of the base 20.

The luminous emblem 13 is not limited to one that transmits the light L1 directly emitted from the light sources 12 as illustrated in the above-described embodiments. For example, the luminous emblem 13 may be configured to transmit visible light that is indirectly irradiated from the light source 12. In other words, the light source 12 does not need to be mounted on the vehicle to emit visible light forward. For instance, the light source 12 may be mounted to emit visible light rearward, or may be disposed to emit visible light in the vertical direction or in the vehicle width direction. In such cases, the visible light may be guided to the luminous emblem 13 by using a separately arranged light guide or the like.

The luminous emblem 13 is not limited to the one disposed in the front portion 11 of the vehicle as illustrated in the above-described embodiments. The luminous emblem 13 may be disposed on a rear portion or a side portion of the vehicle as long as the luminous emblem 13 is disposed outward of the light source. When the luminous emblem 13 is disposed in the rear portion, "outward" relative to the light source corresponds to the rearward direction in the front-rear direction. When the luminous emblem 13 is disposed at the side, "outward" corresponds to the rightward or leftward direction in the vehicle width direction.

The light transmissive panel for a vehicle according to the present disclosure is not limited to the luminous emblem 13 that forms part of an exterior panel, as illustrated in the above-described embodiments. Instead, the light transmissive panel may be implemented as the exterior panel itself.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuitry are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A light transmissive panel for a vehicle configured to be disposed outward of a light source and to form a part of an outer shell of the vehicle, the light transmissive panel comprising:

- a base disposed at a side of the light transmissive panel at which a design surface is provided, the base being transmissive to visible light; and
- a decorative layer stacked on a surface of the base on a side opposite to the design surface, wherein
- the light transmissive panel includes multiple apertures formed through the decorative layer in a thickness direction, each aperture having a bottom surface formed by the base,
- the bottom surface of each aperture has irregularities,
- the apertures are filled with filling portions that are transmissive to visible light,
- the base and the filling portions are each formed of a plastic material with which a difference in refractive index between the base and the filling portions is less than a difference in refractive index between the base and air, and
- the decorative layer includes:
  - a colored layer containing a first colorant; and
  - a concealing layer provided at a side of the colored layer opposite to the base in the thickness direction, the concealing layer containing a second colorant having a higher hiding power than that of the first colorant contained in the colored layer.

2. The light transmissive panel for the vehicle according to claim 1, wherein the base and the filling portions are each formed of plastic materials with which the difference in refractive index between the base and the filling portions is 0.2 or less.

3. The light transmissive panel for the vehicle according to claim 1, wherein the filling portions contain a third colorant.

4. The light transmissive panel for the vehicle according to claim 1, wherein the base includes:

a base body; and a protective layer stacked on a surface of the base body on a side opposite to the design surface, the protective layer containing an additive that reflects laser beams.

* * * * *